3,108,015
ANTI-STICK PAN COATING
Stuart W. Thompson, Upper Saddle River, N.J., assignor to Lever Brothers Company, New York, N.Y., a corporation of Maine
No Drawing. Filed June 15, 1961, Ser. No. 117,283
10 Claims. (Cl. 117—134)

This invention relates to coating compositions and more particularly, to a method for applying coatings to cooking utensils in order to minimize the adhesion of foods prepared therein.

The application of coatings to cookware in order to minimize the adhesion of foods cooked therein and to facilitate cleaning of the utensil is well known. Lecithin, for example, has been used alone and in combination with a vegetable oil for such a purpose. However, the use of lecithin is objectionable particularly in frying foods where a fishy odor develops upon heating the utensil.

It is an object of this invention to provide a composition which, when applied to cooking implements, minimizes the adhesion of foods cooked therein and facilitates easier cleaning of the utensil.

It is another object of this invention to provide a tasteless, non-toxic coating on cookware which permits nearly greaseless cooking and which does not develop a fishy odor when heated.

These and other objects and advantages of the present invention are accomplished by applying to a cooking vessel a thin coating of a composition containing a phosphate ester of a fatty acid diglyceride alone or in combination with an edible oil.

The phosphate esters of fatty acid diglycerides are the essential ingredients of the compositions of the present invention. These esters are disclosed and may be prepared by the procedures described in United States Patent No. 2,177,983. Briefly, the method employed involves reacting a fatty acid ester containing at least one free hydroxyl group with a reagent capable of furnshing phosphate radicals.

The esterifiable fatty material may comprise a monoglyceride or a diglyceride or a combination of both types of esters, the acid moiety thereof being derived from saturated or unsaturated fatty acids or their mixtures. The material use to introduce the phosphate radical into the reaction product may be phosphorus pentoxide, phosphorus halides or any other equivalent reagent.

Where the initial fatty acid ester contains a monoglyceride, it is preferable to prepare the phosphate esters utilizing the pretreating step advocated in U.S. Patent No. 2,177,983 and described more fully in the following examples. For further details involving the preparation of the phosphate esters, reference can be made to the disclosure of the aforementioned patent.

Although the phosphate esters of fatty acid diglycerides yield satisfactory results when used alone for the purposes intended, it is another embodiment of the present invention to utilize a mixture of the phosphate ester with an edible oil. Any vegetable, animal or mineral oil which is edible and nontoxic is suitable for use with the phosphate ester to provide effective coatings on cooking implements.

The proportions of each ingredient present in the mixture can be widely varied, the limits of each being determined mainly by practical considerations. As little as about 10% or even less of the phosphate ester has been found to give a suitable composition. However, with low levels of phosphate ester in the composition, it is necessary to use a heavier coating to prevent sticking. High levels of oil are not only impractical from a standpoint of economy, but they defeat one of the unique attributes of the present invention, i.e., a relatively greaseless cooking operation. As a further consideration, it is pointed out that coatings containing higher levels of phosphate ester may remain somewhat more effective over a longer period of time than coatings containing smaller amounts of the ester.

The preferred means for applying a thin coating of the composition of the invention to the cooking surfaces of utensils is by spraying from an aerosol container. A thin film is thus applied rapidly and uniformly to the surface. In charging the aerosol can, the ester or ester-oil blend is added to the empty container prior to attaching the cap and valve. After completing the latter operation, the propellant (e.g., Freon) is charged through the valve in liquid form under pressure and at room temperature. It is equally possible to cool the container and add the prepellant at a temperature where it is liquid before the top and valve are attached.

It should be evident that other means may be employed to apply a coating to the surface of cooking vessels. A polyethylene squeeze bottle is suitable or the compositions may be merely brushed on the surface. Of course, in some of these alternative operations involving the use of solid phosphate esters, it may be necessary to dilute the ester with an edible oil.

Example I

The fatty materials used to prepare the phosphate esters of this example are Myverol 18:00 (distilled monoglycerides of fully hydrogenated lard fatty acids sold by Distillation Products Industries and containing approximately 95% monoglyceride) and Myverol 18:85 (distilled monoglycerides of cottonseed oil fatty acids).

The phosphate esters themselves were prepared according to the following procedure: In the pretreating step, the Myverol was mixed with 11% of its weight of phosphorus pentoxide in a high speed mixer. The temperature of the mix was raised to 120° C. and held at that temperature for 30 minutes. The mix was then cooled to 100° C. and allowed to settle for 30 minutes. The clear upper layer was decanted and the bottom layer discarded. The decanted liquid was heated to 70° C. and 11% of its weight of $F_2O_5$ was added. An exothermic reaction took place during which the temperature of the reacting mixture was held to 100° C. by the addition of powdered Dry Ice. After cooling to 70° C., the mixture was neutralized to a pH of 7.0 with sodium carbonate and clarified by centrifugation.

The following compositions were weighed into four six-fluid-ounce capacity aerosol cans:

(1) 2.5 grams of the phosphate ester derived from Myverol 18:00.

(2) 1.25 grams of the phosphate ester derived from Myverol 18:00 and 1.25 grams of cottonseed salad oil.

(3) 2.5 grams of the phosphate ester derived from Myverol 18:85.

(4) 1.25 grams of the phosphate ester derived from Myverol 18:85 and 1.25 grams of cottonseed salad oil.

All four cans were charged with 50 grams of Freon 12 and 50 grams of Freon 11 and fitted with spray-type valves.

Frying pans were treated with each of the four aerosols by spraying until the can weight was reduced five grams (equivalent to about 0.125 gram of phosphate ester or mixture of phosphate ester with salad oil on the pan). Eggs were fried in these pans without sticking or developing objectionable odor. In contrast, an aerosol product compounded with a mixture of lecithin and an edible oil developed a fishy odor in a similar egg-frying test.

Example II

The four phosphate ester aerosol prepared in Example I were used to spray cake pans and while they did not completely prevent the adhesion of the batter to the pan, the adhering portions washed off very easily.

It will be appreciated that the present invention provides a composition which may be applied to the surface of all types of cooking utensils to minimize the adhesion of foods cooked therein and to facilitate cleaning the utensil. By applying the coating composition of the present invention, cooking implements can be readily cleaned after use without scouring or resorting to the use of detergents since the remaining food particles may be easily removed by water alone.

Furthermore, application of the phosphate esters to cooking utensils will permit the preparation of many foods without resorting to the extensive use of fats or grease. In effect, a relatively greaseless cooking operation has been developed. The use of the compositions of the present invention is advantageous in the reduction of time and labor for cleaning and in permitting nearly greaseless cooking.

I claim:

1. A method for providing a cooking vessel which can be easily cleaned and which permits a relatively greaseless cooking operation without developing offensive odors which comprises applying to the cooking surface of the vessel a coating composition containing a phosphate ester of a fatty acid diglyceride.

2. The method as recited in claim 1 wherein the coating composition also contains an edible oil.

3. The method as recited in claim 2 wherein the edible oil is a vegetable oil.

4. A cooking vessel having on its cooking surface a coating containing a phosphate ester of a fatty acid diglyceride.

5. The cooking vessel as recited in claim 4 wherein the coating also contains an edible oil.

6. The cooking vessel as recited in claim 5 wherein the edible oil is a vegetable oil.

7. A coating composition which facilitates easy cleaning of cooking vessels and permits a relatively greaseless operation without the development of offensive odors consisting essentially of a phosphate ester of a fatty acid diglyceride in proportions of at least about 10% by weight of the composition and an edible oil.

8. The coating composition as recited in claim 10 wherein the vegetable oil is cottonseed oil and the phosphate ester is derived from the monoglycerides of fully hydrogenated lard fatty acids.

9. The coating composition as recited in claim 10 wherein the vegetable oil is cottonseed oil and the phosphate ester is derived from the monoglycerides of cottonseed oil fatty acids.

10. A coating composition which facilitates easy cleaning of cooking vessels and permits a relatively greaseless operation without the development of offensive odors consisting essentially of a phosphate ester of a fatty acid diglyceride in proportions of at least about 10% by weight of the composition and a vegetable oil.

References Cited in the file of this patent

UNITED STATES PATENTS

| | | |
|---|---|---|
| 2,177,983 | Harris | Oct. 31, 1939 |
| 2,559,481 | Truesdell | July 3, 1951 |
| 2,796,363 | Lalone | June 18, 1957 |

OTHER REFERENCES

"Encyclopedia of Chemical Technology," Interscience Publishers, 1952, vol. 8, p. 309, "Lecithin."